(12) United States Patent
Lindermann et al.

(10) Patent No.: US 12,377,434 B2
(45) Date of Patent: Aug. 5, 2025

(54) DEVICE AND METHOD FOR APPLYING A MATERIAL BEAD

(71) Applicant: Fraunhofer-Gesellschaft zur Förderung der angewandten Forschung e.V., Munich (DE)

(72) Inventors: Matthias Lindermann, Worpswede (DE); Ingo Gebauer, Bremen (DE); Florian Sayer, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 395 days.

(21) Appl. No.: 17/441,006

(22) PCT Filed: Mar. 19, 2020

(86) PCT No.: PCT/EP2020/057710
§ 371 (c)(1),
(2) Date: Sep. 20, 2021

(87) PCT Pub. No.: WO2020/188068
PCT Pub. Date: Sep. 24, 2020

(65) Prior Publication Data
US 2022/0168772 A1 Jun. 2, 2022

(30) Foreign Application Priority Data
Mar. 20, 2019 (DE) .................. 10 2019 203 819.0

(51) Int. Cl.
*B05C 5/02* (2006.01)
*B05B 1/32* (2006.01)
(Continued)

(52) U.S. Cl.
CPC .............. *B05C 5/0225* (2013.01); *B05B 1/32* (2013.01); *B05C 5/0216* (2013.01);
(Continued)

(58) Field of Classification Search
CPC ....... B05C 5/0225; B05C 5/0216; B05B 1/32; Y02P 70/50; B29C 48/155; B29C 48/302
See application file for complete search history.

(56) References Cited

U.S. PATENT DOCUMENTS 2,959,359 A 11/1960 Casaletto
5,323,963 A * 6/1994 Ballu .................. B05B 12/12
239/464

(Continued)

FOREIGN PATENT DOCUMENTS

DE 102010043201 A1 5/2012
WO 2008028970 A1 3/2008
WO 2014066207 A1 5/2014

OTHER PUBLICATIONS

International Search Report and Written Opinion issued in International Application No. PCT/EP2020/057710, mailed Jul. 23, 2020 (with English translation of Search Report), 18 pages.

*Primary Examiner* — Frederick C Nicolas
(74) *Attorney, Agent, or Firm* — Faegre Drinker Biddle & Reath LLP

(57) ABSTRACT

A device for applying a bead of material includes a flexible nozzle body which defines a flow-through volume through which a material can flow for the bead of material, which is partially delimited by a walling formed by the nozzle body, having a feed opening for feeding the material into the flow-through volume. The nozzle body defines a mouth region through which the material can exit from the volume. Furthermore, the device includes an actuator system, which is arranged on the nozzle body and is set up to change a cross section of the mouth region while deforming the nozzle body. The walling forms a barrier between the flow-through volume and the actuator system.

25 Claims, 8 Drawing Sheets

(51) Int. Cl.
    *B29C 48/155*        (2019.01)
    *B29C 48/30*         (2019.01)
(52) U.S. Cl.
    CPC .......... *B29C 48/155* (2019.02); *B29C 48/302* (2019.02); *Y02P 70/50* (2015.11)

(56) References Cited

U.S. PATENT DOCUMENTS

| | | | |
|---|---|---|---|
| 5,799,879 A | 9/1998 | Ottl et al. | |
| 5,961,759 A | 10/1999 | Schubert | |
| 6,475,282 B1 * | 11/2002 | Snodgrass | B05C 5/004 |
| | | | 118/712 |
| 7,240,857 B1 * | 7/2007 | Stern | B05B 1/1645 |
| | | | 222/394 |
| 8,469,292 B1 | 6/2013 | Hanson et al. | |

* cited by examiner

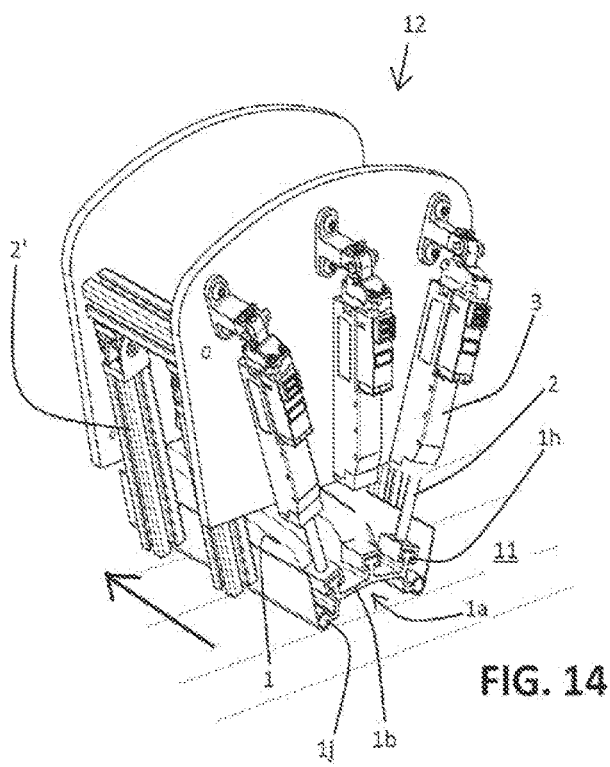

DEVICE AND METHOD FOR APPLYING A MATERIAL BEAD

CROSS REFERENCE TO RELATED APPLICATIONS

The present application is a national stage application of International Application No. PCT/EP2020/057710, filed Mar. 19, 2020, which claims priority to German Application No. DE102019203819.0, filed Mar. 20, 2019, the disclosures of which are hereby incorporated by reference in their entireties.

FIELD OF THE DISCLOSURE

The invention relates to a device for applying a bead of material and an associated method.

BACKGROUND OF THE DISCLOSURE

In the prior art, for example, in wind turbine rotor blade production, for example, when gluing shells for wind turbine rotor blades, beads of paste adhesive are manually applied to an application surface and then brought into a desired contour using a template.

This entails high production effort and limits reproducibility with regard to the geometry and quality of the beads of material produced in this way.

SUMMARY

Against this background, it is the object of the present invention to reduce production costs for beads of material while ensuring the quality of the beads of material.

This is achieved by a device for applying a bead of material having the features of independent claim 1 or by a method according to one of the independent method claims. Advantageous further developments result from the dependent subclaims and from the description and the figures.

The device for applying a bead of material comprises a flexible nozzle body.

The nozzle body defines a flow-through volume through which a material for the bead of material can flow, which volume is at least partially delimited by a walling formed by the nozzle body. A feed opening is provided for feeding the material into the flow-through volume. Furthermore, the nozzle body defines a mouth region through which the material can exit the volume.

Furthermore, an actuator system is provided, which is arranged on the nozzle body and is set up to change a cross section of the mouth region while deforming the nozzle body.

The walling forms a barrier between the volume and the actuator system.

In a first possible embodiment, the flow-through volume is designed as an inner cavity which is delimited by a walling formed by the nozzle body. The mouth region is then designed as an outlet opening of the inner cavity which faces away from the feed opening.

The device according to this first possible embodiment can be described as follows:

The device for applying a bead of material comprises a flexible nozzle body. The nozzle body has an inner cavity through which a material for the bead of material can flow and which is delimited by a walling formed by the nozzle body. A feed opening for feeding the material into the inner cavity and an outlet opening for the material facing away from this feed opening are provided.

Furthermore, an actuator system is provided which is arranged on the nozzle body and which is set up to change a cross section of the outlet opening of the nozzle body while deforming the nozzle body.

The walling forms a barrier between the inner cavity and the actuator system.

In addition to the optional first embodiment just described, other embodiments are also possible according to this application.

In a second possible embodiment, the flow-through volume is designed as a half-open volume. This is open at the bottom and in the mouth region and is delimited at least at the top and on two opposite sides by the walling formed by the nozzle body.

The opened mouth region and the opened underside form a cohesive opening.

If the device according to the second embodiment is placed on an application surface when it is used, the application surface can limit the flow-through volume downwards by closing the open underside. An outlet opening is then defined by the mouth region. The outlet opening is defined at the bottom by the application surface. The outlet opening is delimited particularly at the bottom by the application surface and at the side and at the top by a border of the mouth region.

In this case, in the second embodiment, the feed opening is provided for feeding the material into the flow-through volume, which is delimited at the bottom by the application surface.

Furthermore, in this second embodiment, the actuator system is provided which is arranged on the nozzle body and which is set up to change the cross section of the mouth region and thus of the outlet opening while deforming the nozzle body.

In the second embodiment, the walling again forms a barrier between the flow-through volume and the actuator system.

Further embodiments according to the application are also possible in addition to the first and the second embodiment.

The barrier between the inner cavity or the flow-through volume and the actuator system can ensure that the actuator system does not come into contact with the material when it is fed to the nozzle body through the feed opening and then through the inner cavity or the flow-through volume is moved to the outlet opening or to the mouth region in order to exit there again. The nozzle body or the walling of the cavity or the flow-through volume separates the actuator system from the material guidance of the material to be applied. Contamination of, for example, the actuator system or other support structures or also control or regulating elements for the actuator system can be prevented in this way. In one embodiment, the device can be designed so that all or some of the parts of the device which come into contact with the material of the material bead during use are designed for single use and can be disposed of after use. The nozzle body can particularly be disposed of after use, so that a complex cleaning process can be dispensed with.

When the device is used, the fed material can exit through the outlet opening and then form the bead of material. The contour of the bead of material can be determined or adjusted in a reproducible manner by adjusting the cross section of the outlet opening or the mouth region. A post-processing of the bead of material to produce a desired contour can thus typically be dispensed with.

The device can be set up so that the cross section of the outlet opening or the mouth region is changed by the actuator system while the material flows through the nozzle body. The actuator system and the flexibility of the nozzle body can then ensure that the contour of the applied bead of material can be changed within the scope of the mobility of the actuator system and the flexibility of the nozzle body, wherein the contour is able to be controlled and continuously changed, particularly during application.

The device can then ensure, for example, that when two components are glued, a need-based use of material for an existing adhesive gap can be ensured and excess material in the gluing can be avoided. In addition, a high degree of reproducibility of the beads of material or adhesive beads produced with the aid of the device can result. It is typically no longer necessary to use and, particularly, change geometry templates, so that air inclusions or undesired discontinuities in the bead of material, which can arise as a result, can be avoided.

An axis system can be defined which is oriented so that the outlet opening or the mouth region or rather a border of the outlet opening or the mouth region lies in an x-y plane when the nozzle body is in a neutral state. The neutral state can be defined, for example, in that the nozzle body is relaxed (that is, not elastically deformed) and/or in that the actuator system connected to the nozzle body is in an initial position. The cross section of the outlet opening can change so that the geometry of the outlet opening changes within the x-y plane. The outlet opening can remain in this x-y plane, that is, it is possible for its normal vector and thus also a direction in which the material exits to remain constant. Naturally, in the case of the second embodiment, the border of the mouth region is not a circumferential border, but a border spanning three sides, wherein the lower side is missing. The x-y plane can also be defined here based on the three existing sides.

The embodiments described below can advantageously be used in devices according to the application, particularly in connection with the first embodiment and/or in connection with the second embodiment.

The actuator system can comprise at least one finger that can be moved by an actuating unit. The at least one finger can, for example, be fastened to the border of the outlet opening or rather the mouth region or in the vicinity of the border of the outlet opening or rather the mouth region on the nozzle body.

In one possible embodiment, the actuating unit is designed as a pneumatic or electromechanical actuator system.

The actuator system for changing the cross section of the outlet opening or the mouth region of the nozzle body can, in embodiments, comprise at least 2, at least 3 or at least 5 fingers. Alternatively or additionally, it can comprise a maximum of 20 fingers or a maximum of 15 fingers.

The actuator system and the nozzle body are designed in one embodiment so that differently sized outlet openings of the same or of different geometry can be set—for example, so that differently sized circular or elliptical outlet openings can be set and/or so that different polygonal cross sectional geometries can be set, the size of which can preferably be changed in turn. For example, a triangular cross section can be set for the outlet opening, wherein a lower side of the triangle, the length of which can be adjusted by means of the actuator system, can run horizontally and an upper corner of the triangle can run through the actuator system to change the height and the other side lengths of the triangle can be movable with the aid the actuator system. The actuator system and the nozzle body can be designed so that a width of the outlet opening can be at least 20 mm or at least 30 mm or at least 50 mm and/or at most 400 mm or at most 300 mm or at most 200 mm. Naturally, in the case of the second embodiment, the adjustable outlet openings are limited to geometries that correspond to the application surface at the bottom, that is, as a rule, are flat at the bottom. The changeable mouth region can, for example, assume polygonal or circular arc-like or elliptical-arc-like shapes.

In embodiments of the nozzle body, this allows an increase in the width and/or the height of the cross section of the mouth region by at least 50%, preferably by at least 80%, particularly preferably by at least 90% compared to the cross section of the mouth region in the relaxed state. In an advantageous embodiment, the width and height can be increased simultaneously by 100% without the nozzle body being damaged. For example, it allows the width and/or height of the cross section of the mouth region to be increased by up to 110% or by up to 150% or by up to 200%.

The nozzle body can contain or consist of a highly elastic silicone.

In one embodiment, the actuator system can be arranged on an outside of the nozzle body.

The actuator system can form a shaping external structure with a variable shape for the nozzle body, against which the nozzle body can be pressed under conveying pressure. That is, the actuator system, that is, for example, fingers of the actuator system, can be arranged along a length of the nozzle body. In addition to deforming the opening, it is also possible to control the shape of the nozzle body along its length by means of such an external structure.

The nozzle body can be elongated in form. The shape of the flow-through volume or the inner cavity and/or the outer shape of the nozzle body can vary along its length.

The nozzle body can have a connection option for the feed device—for example, for the feed hose—which makes it possible to connect the feed device to the nozzle body. The material can be fed into the feed opening and thus into the inner cavity through the connected feed device. The connection option can be designed, for example, as a connecting piece.

The nozzle body can have an outwardly bent section in the region of the border of the mouth region or the outlet opening. That is, a material of the nozzle body which forms the walling of the nozzle body can, for example, be everted on the side of the mouth region or the outlet opening. In one embodiment, the material can be completely everted. For example, the material can be everted by 180° or approximately 180°, so that one end of the material points to the rear, in the direction facing away from the outlet opening. The material can also be everted by more than 180°, for example, approximately 270° or even more, so that the end of material points in the direction of an outside of the walling and an undercut is formed.

In the region of the border of the mouth region, the nozzle body can alternatively or additionally also have outer holding structures which are set up for connection to the actuator system or a support structure. The outer holding structures can also be provided in the vicinity of the mouth region in order to advantageously enable a deformation of the outlet opening.

In one embodiment, the actuator system can be connected to the nozzle body in a form-fitting manner. For this purpose, the actuator system, that is, for example, the finger or fingers, can have one or more recesses and/or one or more undercuts for the rear hook and/or structures complementary to the holding structures. The actuator system can be fastened to the border or in the vicinity of the border of the mouth region or rather the outlet opening in order to be able to deform the outlet opening as directly as possible. For the form-fitting fastening to the border or in the vicinity of the border, for example, the outwardly bent region of the nozzle body, which can form an undercut, can be provided and put over the actuator system for fastening to the actuator system. In one embodiment, the bent region can be hooked behind on an undercut or in a recess of the actuator system. If present, the holding structures and the structures complementary thereto can also be connected to one another, particularly connected in a form-fitting manner, for example, by plugging or sliding one into the other.

In the case of the second embodiment particularly, lateral holding structures can be provided, which can also be holding structures in the above sense. These can be set up to be connected to a support structure such that the nozzle body can be pressed against the application surface. For this purpose, these lateral holding structures can be provided, for example, in a lower section of the sides of the walling, preferably at the lower end of the sides of the walling. In possible embodiments, the lateral holding structures are provided not only in the vicinity of the mouth region but over a larger part of the length, particularly over an entire length of the nozzle body. The sides of the walling can thus be pressed onto the application surface particularly well. The lateral holding structures connected to the support structure can also prevent undesired deformations of the nozzle body when it is under the pressure of the material flowing through and/or is deformed by the actuator system. The lateral holding structures are, for example, also connected to the support structure via an actuator system. This actuator system enables, particularly, a widening of the cross section of the mouth region and thus of the outlet opening.

In the device, the actuator system can engage in an upper border section of the border of the mouth region or rather the outlet opening or in the vicinity of the upper border section, so that the cross section of the outlet opening can be adjusted by deforming this upper border section by means of the actuator system. In the first embodiment, the nozzle body can comprise a lower walling section facing away from the upper border section. This lower border section facing away from the upper border section typically faces the application surface when the device is used. That is, a side of the bead of material exiting along the lower border section typically comes to rest on the application surface, while a side of the bead of material exiting along the upper border section constitutes an upper side of the bead of material for which the contour can be specified by the actuator system arranged in the upper border section.

The lower border section of the outlet opening can be designed to be placed on the application surface to which the bead of material is to be applied. This can be done, for example, while deforming the lower border section by the application surface. The lower border section can be designed to be freely deformable so that it can adapt to the application surface, for example, when it is pressed against it.

The lower border section facing away from the upper border section can be recessed and/or incised. That is, it can be recessed or incised with respect to the upper border section, so that the nozzle body is open downwards at the outlet opening. A corresponding incision can be made at the same time as the nozzle body is manufactured, for example, if the nozzle body is manufactured additively, or it can be introduced subsequently. The outlet opening is correspondingly enlarged by the incision or the recessed region and extends, apart from in the x-y plane (in which its geometry can be changed by the actuator system that engages the upper border section) on the underside of the nozzle body also in the z direction. Due to the outlet opening enlarged in the z direction, the exiting material can come into contact with the application surface earlier and, for example, in some embodiments when applying from above, the nozzle body located above it can still be pressed against the application surface.

The two embodiments last described, which relate to the lower border section, are based, as mentioned, on the first embodiment. They are similar to the second embodiment, in which a lower border section is missing, insofar as here, too, the shape of the material can already be defined by the application surface if the material is still in the flow-through volume—either because the application surface at least partially delimits the flow-through volume or because the application surface deforms a lower wall of the inner cavity or presses against it, when this is placed thereon, and in this way influences the shape of the material contained therein.

For each of the embodiments, the nozzle body can optionally be designed so that it forms a buffer volume. The buffer volume is, for example, on the side opposite the outlet opening. The buffer volume can be arranged so that it can take up excess material at least temporarily when an exit speed of the material and/or a movement of the device is slowed down. With regard to the feed opening, for example, the flow-through volume can be arranged in a rear region and the buffer volume on the other side of the feed opening, in a front region. For example, optimal filling of the nozzle body can be ensured and/or a regularity of the bead of material can be promoted in that differences in material feed and material discharge—caused for example, by non-constant feed rates—can be compensated for. If the buffer volume is arranged on the side of the nozzle body facing away from the outlet opening, the feed opening can open into the nozzle body between the outlet opening and the buffer volume. The feed opening can open into the nozzle body at the side or at the top, for example.

The buffer volume can particularly have a larger cross section than the flow-through volume.

Alternative or additionally, in all embodiments, the nozzle body can have a frontal opening. The frontal opening faces away from the outlet opening. For this purpose, the feed opening is arranged, for example, so that it opens into the nozzle body at the top or at the side. The frontal opening can, by itself or in combination with the buffer volume, promote the pressure conditions and/or an advantageous distribution of the material within the nozzle body, that is, within the flow-through volume and/or the buffer volume.

It is also possible to specify a fixed shape for the lower border section, for example, by means of a frame structure. As a result, the border on the underside becomes stiff and retains its shape even if pressure is caused by the material located in the interior the nozzle body. This makes it possible, particularly, to move the device along the application surface at a distance from the application surface. This can be provided, for example, if the movement is to be carried out by a robot.

In addition to the variants of the freely deformable and the rigid lower border section, there is also the possibility of also providing an actuator system for the lower border section with which actuator system the lower border section can be deformed. The actuator system is then also provided for the deformation of the lower border section. For this purpose, the actuator system then also engages the lower border section or in the vicinity of the lower border section. The cross section of the outlet opening can then be adjusted by deforming the upper and/or the lower border section by means of the actuator system.

In an embodiment in which the upper and lower border sections can be deformed, the actuator system is arranged symmetrically around the output opening. For example, in one embodiment, it can be arranged in a rotationally symmetrical or uniform manner around the opening, for example, with rotationally symmetrical and/or evenly spaced fingers, which are fastened to the border or in the vicinity of the border of the outlet opening.

In possible embodiments, the device can comprise a tilt actuator system which is set up to tilt the outlet opening of the nozzle body. The outlet opening can, for example, be tilted with respect to a plane defined by its cross section in the relaxed state, with the nozzle body being deformed. The cross section of the outlet opening can be kept constant when the outlet opening is tilted. However, the cross section can also be changed when the outlet opening is tilted.

The tilt actuator system can be designed by the actuator system to change the cross section of the outlet opening of the nozzle body. This is possible, for example, in those embodiments in which the actuator system for changing the cross section of the outlet opening is provided on the upper and lower border sections. The outlet opening can then also be tilted by this actuator system—particularly so that the outlet opening is directed upwards or downwards. In the case of the second embodiment, in which the lower border section is missing, the actuator system or a fixation can be provided in a lower region of lateral border sections of the mouth region, for example, via the lateral holding structures.

However, it is also possible to provide the tilt actuator system as a further actuator system in addition to the actuator system for changing the cross section of the outlet opening of the nozzle body. In one embodiment, this further actuator system can engage the actuator system to change the cross section of the outlet opening. The further actuator system can in turn comprise fingers and actuating units. The further actuator system can be designed as a pneumatic or electromechanical actuator system.

The nozzle body can, for example, be designed as a disposable product for single use.

The nozzle body can, for example, be designed in one piece.

The nozzle body can be manufactured additively, for example.

The nozzle body can, for example, be made of a rubber-like material, such as a highly flexible plastic. For example, materials from the Tango family or from the Agilus30 family from Stratasys Ltd. can be used for the nozzle body. The material of the nozzle body can, for example, have a Shore A hardness. In embodiments of the nozzle body, the Shore hardness of the nozzle body can be, for example, at least 10 or at least 20 or at least 27 and/or at most 100 or at most 95.

In some embodiments, the nozzle body can also have a spatially varying Shore hardness. For example, it can be softer in the region of the outlet opening, that is, in the region of the feed opening (for example, in the region of the possible connecting piece).

In one embodiment, the device can have a control and/or regulating device. The control and/or regulating device can be set up to move the device along the application surface and/or to move the actuator system. The movement along the application surface and/or the movement of the actuator system can be preprogrammed.

In one possible embodiment, the device can comprise a sensor for detecting a contour of the bead of material. For example, the control and/or regulating device can then control the actuator system based on values detected by the sensor.

The application further relates to a method for using the device presented.

In the method, particularly, a viscous material can be used in order to produce a stable bead of material, the shape of which is defined by the cross section of the mouth region. Naturally, it is typical for the method that the materials are so tough that the beads of material have such a stability that they retain this shape at least as long or essentially retain it until further processing takes place, precisely for which this shape the bead of material is required.

In such a method, the material for the bead of material is typically fed through the feed opening so that it exits from the outlet opening. In this case, while the material exits from the outlet opening, the device is moved along an application surface, so that the bead of material is formed on the application surface by the exiting material. While the material exits and the device is moved along the application surface, the cross section of the outlet opening can be changed by the actuator system in order to change the contour of the bead of material.

This applies both to the uses of devices according to the first embodiment, in which the outlet opening can be completely defined by the mouth region of the nozzle body, and to devices according to the second embodiment, in which the nozzle body is placed on the application surface so that it closes off the outlet opening at the bottom and thus a deformation only takes place in the part of the outlet opening formed by the mouth region.

The movement of the device along the application surface, according to a desired course of the bead of material, can be performed or controlled by a user, or it can be automated. The actuator system can be moved - regardless of how the device is moved along the application surface - likewise by a user or in an automated manner.

For manual movement of the device along the application surface, the device can, for example, be anchored in a suspension or guide so that it can be moved or displaced manually. For automated movement of the device along the application surface, the device can be connected, for example, to a robot, for example, a six-axis robot.

If the movement of the actuator system is to be performed or controlled by a user, an input option, for example, in the form of a user interface or a switch, rotary knob or lever, can be provided, with which the user can set the cross section, for example, in which he or she controls continuous movement of the actuator system or in which he or she selects from a predetermined selection of cross sections (cross sectional geometries and/or cross sectional sizes).

It is also possible for the device to move along the application surface manually or automatically, while the movement of the actuator system is controlled or regulated based on values detected by the possible sensor.

The device can be moved along the application surface such that the device, that is, particularly the lower border section or the underside of the nozzle body, is in contact with the application surface, that is, is pressed against it, for example. This is provided in the method for using the device according to the second embodiment so that the application surface can delimit the flow-through volume and the outlet opening at the bottom. However, it can also be done such that the device maintains a predetermined distance from the application surface, for example, when it is a device in which the nozzle body has an inner cavity.

In one embodiment of the method, the tilt angle is changed by means of the possible tilt actuator system while the bead of material is being applied. This can be done, for example, as a function of a geometry or an angle of inclination of the application surface.

In one embodiment of the method, at least 100 g or at least 1 kg or at least 3 kg and/or at most 25 kg or at most 20 kg of material are applied per minute.

In one embodiment of the method, the bead of material has a width of at least 20 mm or at least 30 mm or at least 50 mm and/or a width of at most 400 mm or at most 300 mm or at most 200 mm.

In the method, for example, it is possible to produce one or more beads of material using the same nozzle body, wherein the one or more beads of material have a combined weight of 100 kg or more, or 500 kg or more, or 800 kg or more. Alternatively or additionally, the one or more bead(s) of material produced in this way may have a combined weight of at most 3000 kg. For example, it is possible for the nozzle body to be replaced at the latest after 3000 kg of material have passed through the nozzle body.

The application surface to which the bead of material is applied can be, for example, a surface of a wind turbine component, for example, a wind turbine rotor blade. For example, the material can be an adhesive which is applied to these rotor blade half-shells and/or stiffening elements for gluing rotor blade half-shells or stiffening elements of rotor blades.

The fed material can be, for example, a pasty medium or a foaming medium.

In some embodiments, a reactive adhesive, for example, a reactive two-component adhesive, is used as the fed material. A curing time for the adhesive used can be between 60 and 90 minutes, for example.

The device or the method can particularly be suitable for beads of material made of difficult-to-handle materials that are, for example, very tough or highly pasty.

In one example, the device is used in the food industry, wherein the fed material can be a food, for example, a pastry dough. Here, the device can separate the food from the machine components. The nozzle body can be made of a food-safe material.

The nozzle body can, for example, also, for example, if the device is to be used in the food industry, be made of silicone, particularly of food-safe silicone. For example, the nozzle body can also be produced by vacuum casting.

It is possible, for example, for the device to be used for additive manufacturing and for a material for additive manufacturing to be selected for the bead of material. Then, particularly, especially large structures - for example, the above-mentioned amounts of material or structures comprising even larger amounts of material—can be additively manufactured with the aid of the method shown here. For example, concrete can be 3D printed.

In another example, the device can be used in mold construction, wherein component surfaces are pasted therewith, for example. In another example, the device is used in the automotive industry.

It should be mentioned that features that were only described in connection with the method can also be claimed for the device and vice versa.

It should further be mentioned that an "application surface" in the sense of this application is to be understood as any location at which the bead of material according to the application can be applied or is to be applied. The term is not to be understood as restrictive to the effect that it must be a "surface" in the narrower sense. It can also be, for example, a groove, notch, edge or the like.

In the following, the device and the method are explained in more detail with reference to figures.

BRIEF DESCRIPTION OF THE DRAWINGS

Embodiments are disclosed in the accompanying drawings. Shown therein:

FIGS. 14 and 15 illustrate the device for applying a bead of material according to an embodiment 2;

FIGS. 16 and 17 illustrate the nozzle body for the device according to embodiment 2.

DETAILED DESCRIPTION OF THE DRAWINGS

Figure 1:
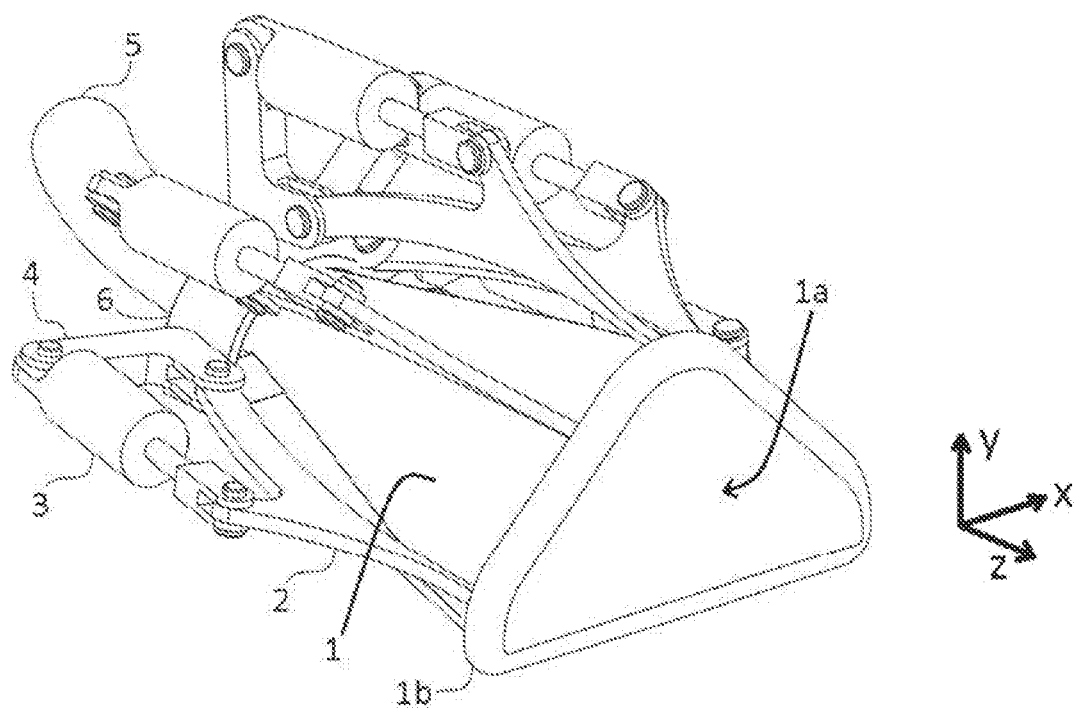
FIGS. 1, 2, and 3 illustrate a device for applying a bead of material in an embodiment 1A.

FIG. 1 shows a device for applying a bead of material. This comprises a flexible nozzle body 1, which has an inner cavity through which a material for the bead of material 9 can flow and which is delimited by a walling formed by the nozzle body 1. An outlet opening 1*a* can be seen in FIG. 1, from which outlet opening the material can exit when the device is used in order to form the bead of material. At one end of the inner cavity facing away from the outlet opening, there is a feed opening (see below, for example, the description of FIG. 13) which is connected to a feed hose 5. In the method for using the device, a material can be fed to the inner cavity through the feed opening. This moves under pressure through the inner cavity and then, as mentioned, exits from the outlet opening 1*a*.

Furthermore, an actuator system is arranged on the nozzle body 1. It is set up to change a cross section of the outlet opening 1*a* while deforming the nozzle body 1.

The walling that delimits the inner cavity forms a barrier between the inner cavity and the actuator system. This ensures that the actuator system is not contaminated by the material. Only the nozzle body 1 is in contact with the material and can be disposed of after use.

The actuator system comprises five fingers 2, each of which can be moved by actuating units 3. The fingers 2 run on a border 1*b* of the outlet opening 1*a* or in the vicinity of the border 1*b* of the outlet opening 1*a* and are fastened on the nozzle body 1. The actuating units are designed pneumatically or electromechanically or designed to be adjusted manually. The actuator system is arranged on an outside of the nozzle body 1. The actuator system extends along the outside of the nozzle body and thus forms a shaping external structure for the nozzle body 1 having a shape that can be changed by the actuating units. This means that the actuator system not only deforms the outlet opening 1*a* but can also influence the shape of the nozzle body 1 along its length. When using the device, the flexible nozzle body 1 is pressed against the supporting and shaping external structure by the applied conveying pressure. There is a functional separation between the supporting and shaping external structure and the inner, flexible nozzle body, which is in direct contact with the conveying material and separates it from the external structure.

The actuator system furthermore comprises a base body 6 on which a plurality of holders 4 are arranged. The holders are connected to the fingers 2. The fingers 2 can be actively moved individually manually, pneumatically or electromechanically via the actuating units 3. A passive adjustment via a central element such as a template is also conceivable. There is also a fastening option for the feed hose on the base body.

The actuator system engages in an upper border section of the border 1b of the outlet opening 1a. The cross section of the outlet opening 1a can thus be adjusted by deforming the upper border section by means of the actuator system. A lower border section facing away from the upper border section is kept freely deformable and can adapt to a surface shape of an application surface when it is pressed against it when the device is used. The five fingers 2 of the actuator system are arranged so that they can deform the upper border section while the lower border section remains straight. The lower border section can be kept under tension by the fingers 2 which are arranged furthest out, or an opening width of the outlet opening 1a can be set. For example, opening widths can be adjustable between 50 mm and 200 mm. The fingers 2 are also arranged so that a triangular shape can be specified for the outlet opening 1a.

Figure 2:
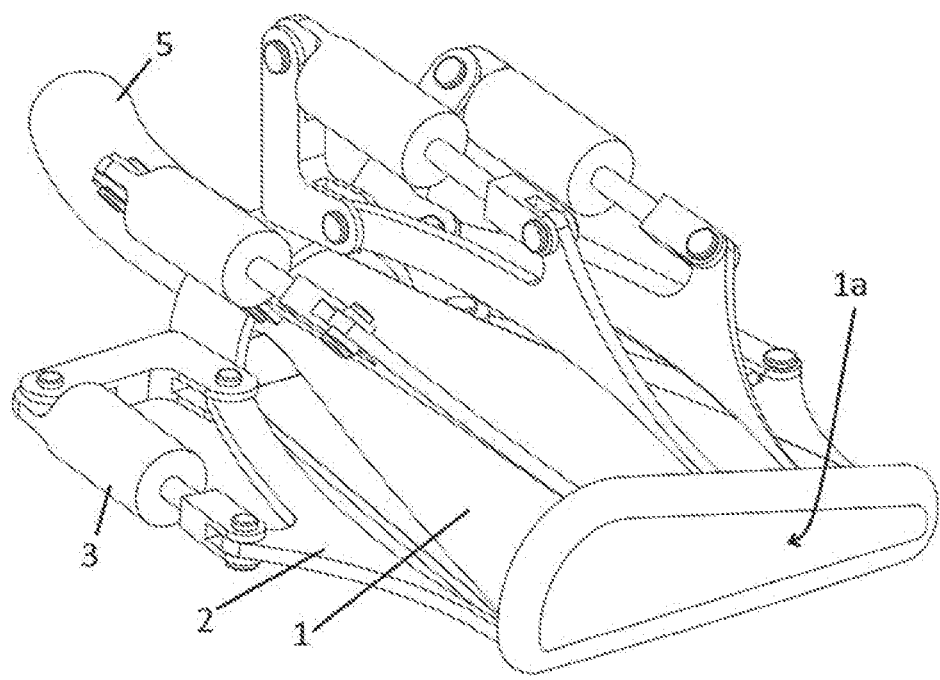
Figure 3:
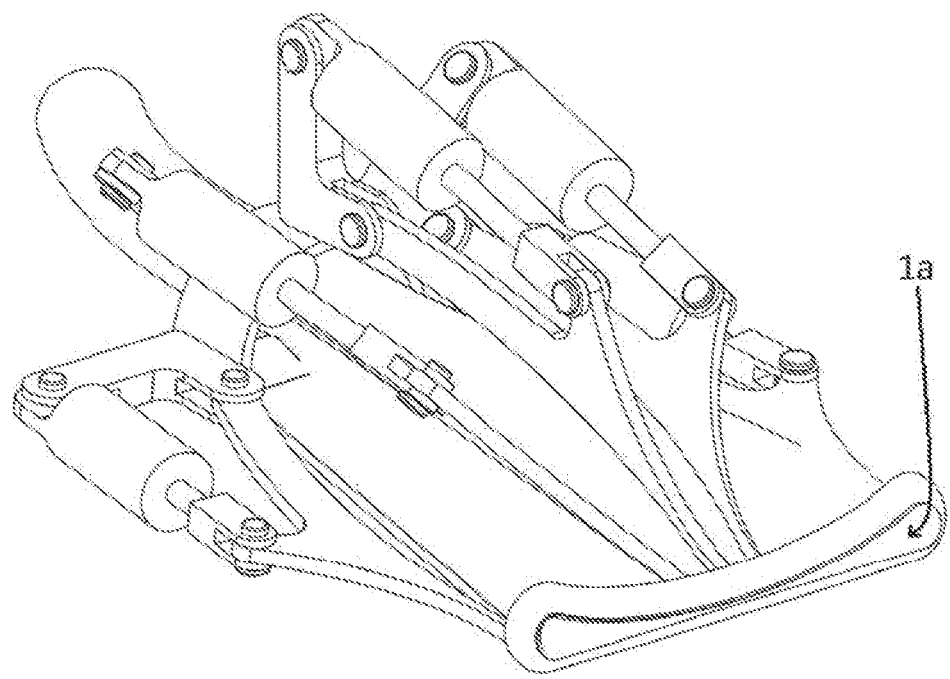

FIGS. 1 to 3 show, by way of example, possible geometries for the outlet opening 1a, which can be adjusted with the fingers 2 arranged as shown here. The holders of the fingers 2 can be rotatably mounted in order to ensure flexibility in rotation and thus to be able to produce asymmetrical beads of material. In FIG. 1, a shape of an isosceles triangle is provided for the outlet opening 1a. In FIG. 2, the outlet opening 1a has an asymmetrical triangular shape. In FIG. 3, an almost closed state of the nozzle body 1 is shown. The nozzle unit 1 can be opened or closed by adjusting the fingers 2, and an adhesive bead having a corresponding geometry can be applied due to the variable shape of the outlet cross section.

FIGS. 1 to 3 show that the border 1b of the outlet opening 1a is formed by a section of the nozzle body 1 which is bent outwards. The actuator system is connected in a form-fitting manner to the nozzle body 1 in that the outwardly bent region of the nozzle body 1 is put over the fingers 2 of the actuator system and hooked behind there. This is shown in detail in FIG. 4.

Figure 4:
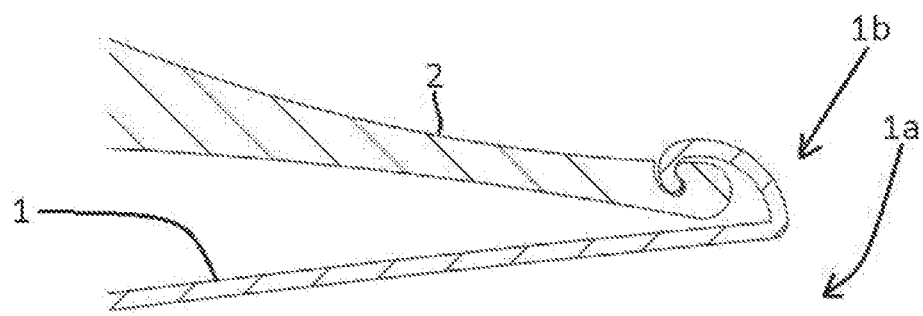
FIG. 4 illustrates a form-fitting connection between an actuator system and a nozzle body of the device for applying a bead of material.

FIG. 4 illustrates the fastening of the nozzle unit 1 to the fingers 2. The fastening between the fingers 2 and the nozzle body 1 takes place in a form-fitting manner via an undercut in the nozzle body 1, which is formed by the bent region. The section of the nozzle body 1 extending to the left of the bent region in the figure represents the walling of the inner cavity. The bent region is bent by a little more than 270°, so that one end of the material points in the direction of an outside of the walling of the nozzle body and the undercut is thus formed. The bent region is put over the fingers 2 and hooked behind. The finger 2 also has a recess into which the bent region is locked. In this arrangement, the fingers 2 engage the border 1b or in the immediate vicinity of the border 1b of the outlet opening 1a and thus enable good control of the geometry of the outlet opening 1a. FIG. 4 shows that the continuous configuration of the walling creates a barrier between the inner cavity and the outer actuator system.

The form-fitting connection shown enables easy connection and removal of the nozzle body. The device can thus be brought into a state of use by pulling the bent region of the nozzle body 1 over the fingers 2. After use, the nozzle body 1 can be pulled off and disposed of. There is no need to clean the actuator system, since the actuator system does not come into contact with the material while the device is in use.

In other embodiments, alternatively or additionally, fastening can be provided by means of tensioning straps and/or according to the principle of a circlip and/or by means of clamping strips.

Figure 5:
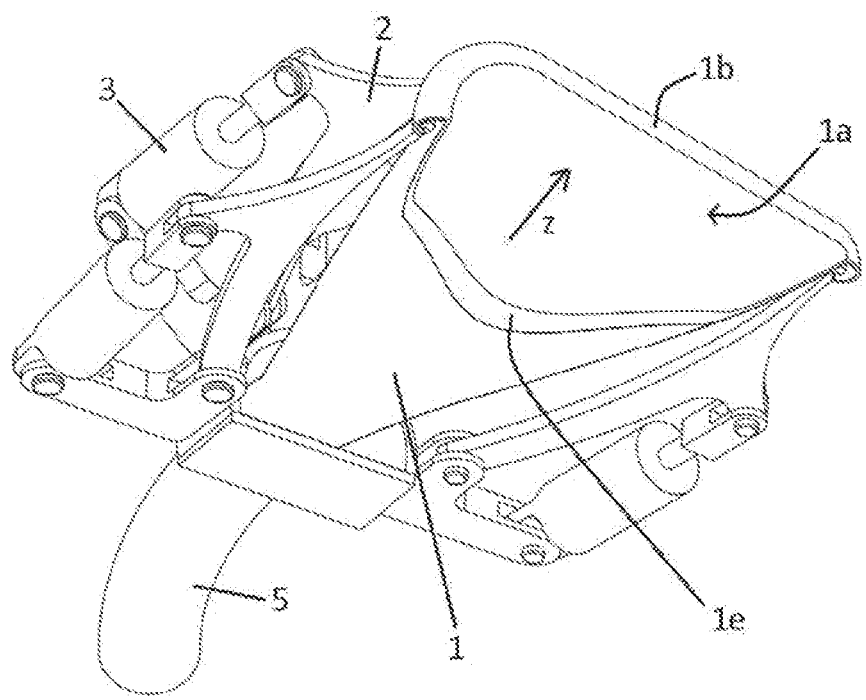
FIG. 5 illustrates the device for applying a bead of material in an embodiment 1B.

FIG. 5 shows an embodiment of the device that is modified compared to FIGS. 1 to 3. A lower border section facing away from the upper border section is incised and thereby recessed with respect to the upper border section. As a result, the nozzle body is also open downwards at the outlet opening 1a. That is, the outlet opening 1a is enlarged accordingly. As a result, a contact pressure can be exerted on the bead of material when the material is applied. A section of the nozzle body or the device is still above the bead of material when it is in use, if it is already in contact with the application surface due to the opening downwards. The adhesion to the surface to be applied can be increased in this way. This can be of particular importance in the case of inclined application surfaces.

The arrangement of the actuator system corresponds to that shown in FIGS. 1 to 3. In the embodiment from FIG. 5, too, the cross section of the outlet opening 1a can be adjusted by deforming the upper border section by means of the actuator system. Here too, the symmetrical or asymmetrical triangular geometries shown above can particularly be achieved.

The incision constitutes an expansion of the outlet opening in the negative z direction if the axis system defined in FIG. 1 is used as a basis. A bent region, which is provided where the nozzle body is not incised or recessed, lies in the x-y plane.

A section 1e of the border 1b of the outlet opening 1a that delimits the incision and is located on the underside of the nozzle body 1 is flexible and freely deformable in order, as also described in connection with FIGS. 1 to 3, to adapt the nozzle body 1 to the shape to enable the application surface under contact pressure.

Figure 6:
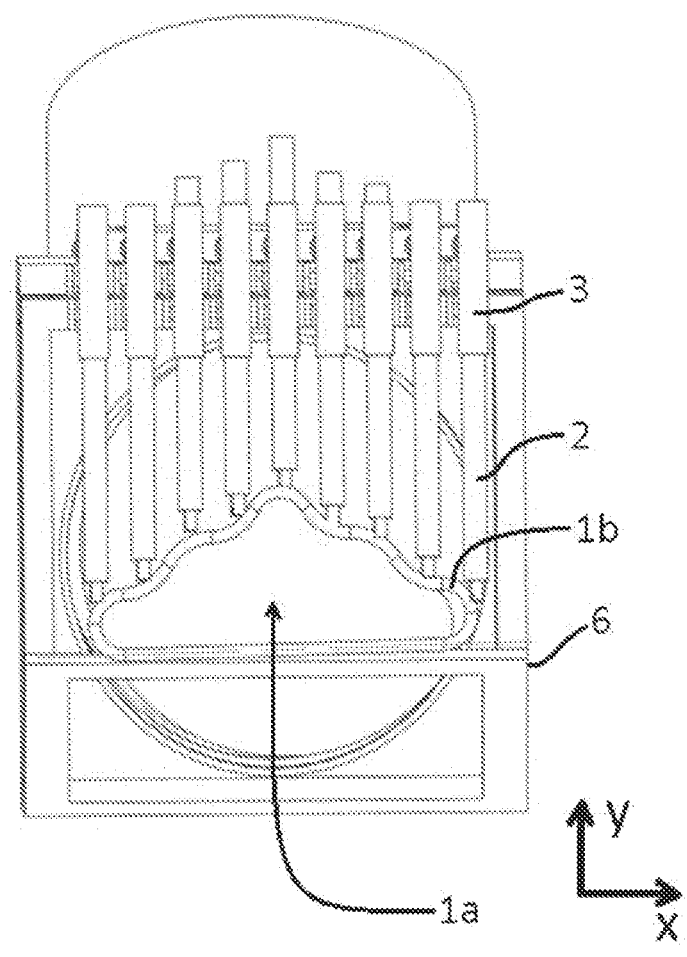
FIGS. 6, 7, and 8 illustrates the device for applying a bead of material in an embodiment 1C.
Figure 7:
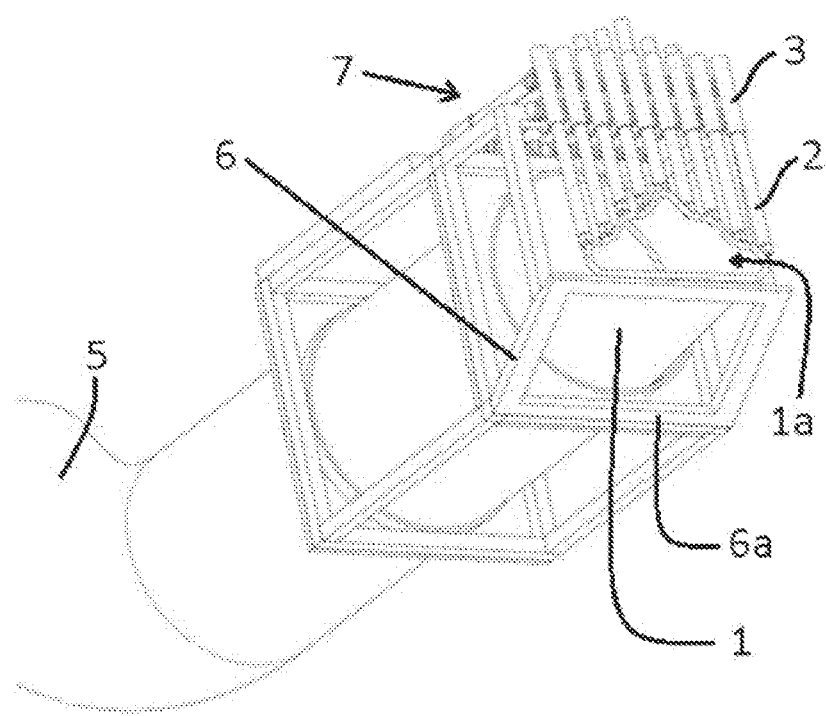
Figure 8:
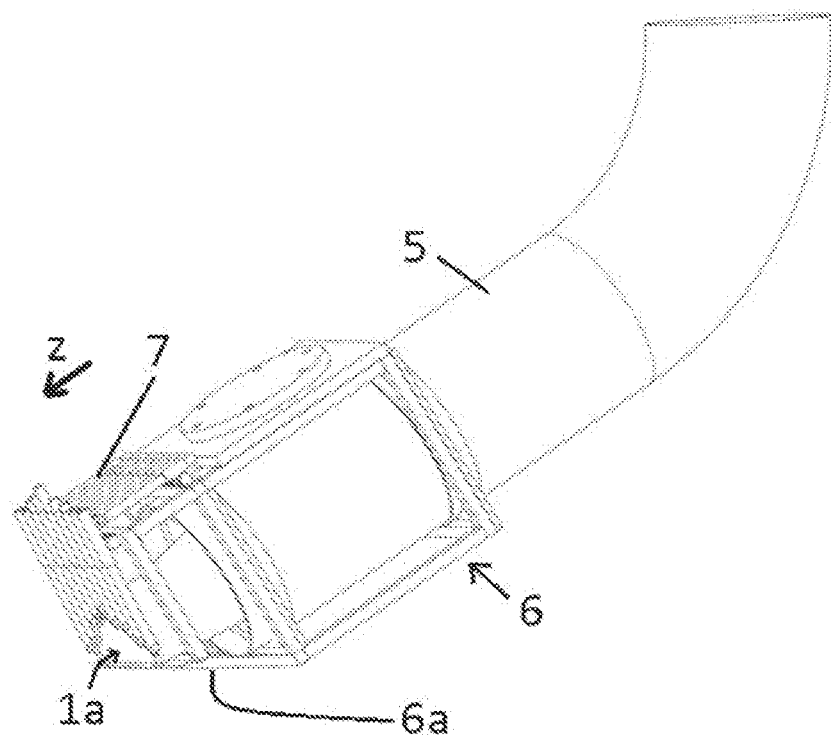

FIGS. 6 to 8 show a further modified embodiment of the device presented. FIG. 6 shows a view from the front of the outlet opening, which lies in the x-y plane. FIGS. 7 and 8 show oblique views obliquely from below and obliquely from the side.

In the embodiment shown, a frame structure 6 is arranged around the nozzle body 1. The actuator system is fastened to the frame structure 6, wherein the fingers 2 extend in the plane defined by the outlet opening 1a and are linearly movable within this plane by the actuator system.

The actuator system is pivotably fastened to the frame structure, and the device has a further actuator system 7 as a tilt actuator system for angular adjustment. This engages the actuator system to change the cross section of the outlet opening 1a. In turn, it comprises further linearly adjustable fingers with associated actuator systems. The tilt actuator system can cause the actuator system to pivot in order to change the cross section of the outlet opening 1a, as a result of which the outlet opening 1a is also tilted. An angle change in the outlet cross section can therefore be brought about via the further actuator system 7. This makes it possible to change the angle at which the bead of material exits relative to the application surface. If the angle of the outlet opening 1a is changed in this way, the nozzle body 1 is deformed and the outlet opening is tilted particularly with respect to a plane defined by its cross section in the relaxed state.

The fingers 2 of the actuator system for changing the cross section of the outlet opening 1a engage the upper border section, while the lower border section is fastened to the frame structure 6 so that a straight shape is fixed therefor. A connecting line, along which the lower border section is connected to the frame structure, represents an axis of rotation for the tilting movement, which can be brought about by the second actuator system 7 for the outlet opening 1a.

One side of the frame structure 6 represents a base surface 6a which, when the device is used, is at the bottom (see FIG. 8) and thus faces the application surface. In some embodiments of the method, the base surface 6a can be in contact with the application surface or can be guided along it at a distance from the application surface and, for example, can be held parallel to the application surface. In the neutral state, the outlet opening 1a has an inclination in the direction of the application surface, so that the exiting material exits in the direction of the application surface, wherein the inclination is able to be increased by the tilt actuator system 7. Here, too, there is the possibility of additionally pressing the exiting material onto the application surface from above.

In the example of FIGS. 6 to 9, the cross section of the outlet opening 1a can again be adjusted by deforming the upper border section by means of the actuator system. Here, too, the device is again set up to assume, particularly, symmetrical or asymmetrical triangular shapes. In the example of FIGS. 6 to 9, nine fingers 2 are provided for the actuator system in order to effect a precise adaptation and precise control of the geometry of the outlet opening.

Figure 9:
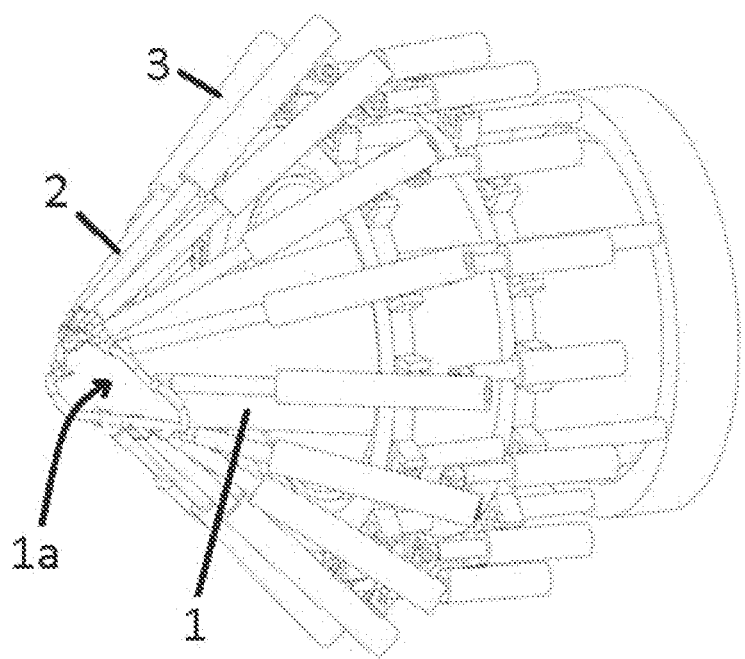
FIGS. 9 and 10 illustrate the device for applying a bead of material in an embodiment 1D.
Figure 10:
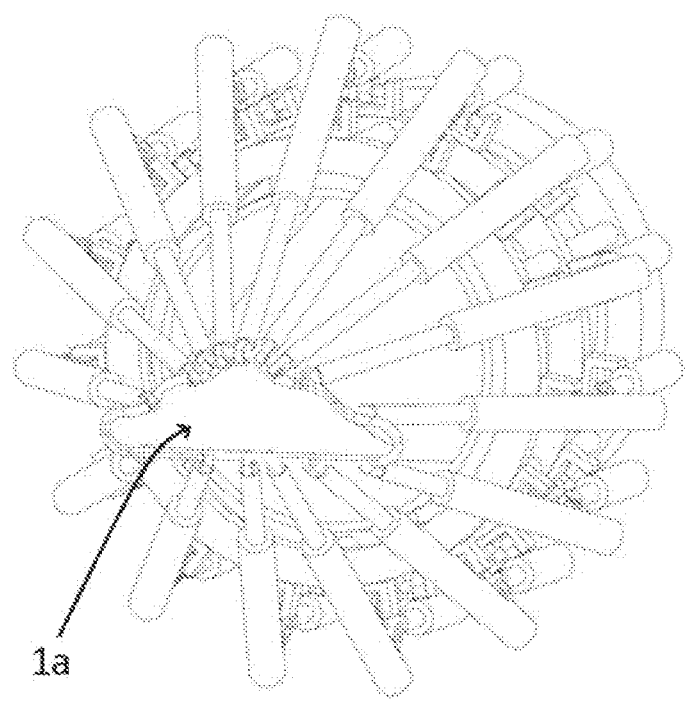

FIGS. 9 and 10 show a further embodiment of the device, wherein the actuator system is arranged on the outside of the nozzle body 1 in a rotationally symmetrical manner. 15 fingers 2 are arranged here at regular intervals around the outlet opening 1a. The fingers 2 are arranged obliquely to the plane of the outlet opening 1a and in this way enable the geometry of the outlet opening to be changed and the outlet opening to be tilted. The actuating units 3 enable the linear adjustment of the fingers and, for their part, can be pivoted by means of a further actuator system, so that the degrees of freedom are still increased. Tilt actuator system and actuator system for adjusting the cross section interact with one another and cannot be separated from one another. The actuator system is thus designed at the same time as a tilt actuator system and an actuator system for adjusting the cross section of the outlet opening.

The fingers 2 are here again connected to the nozzle body at the border 1b of the outlet opening 1a by pulling over a bent region of the nozzle body 1.

Figure 11:
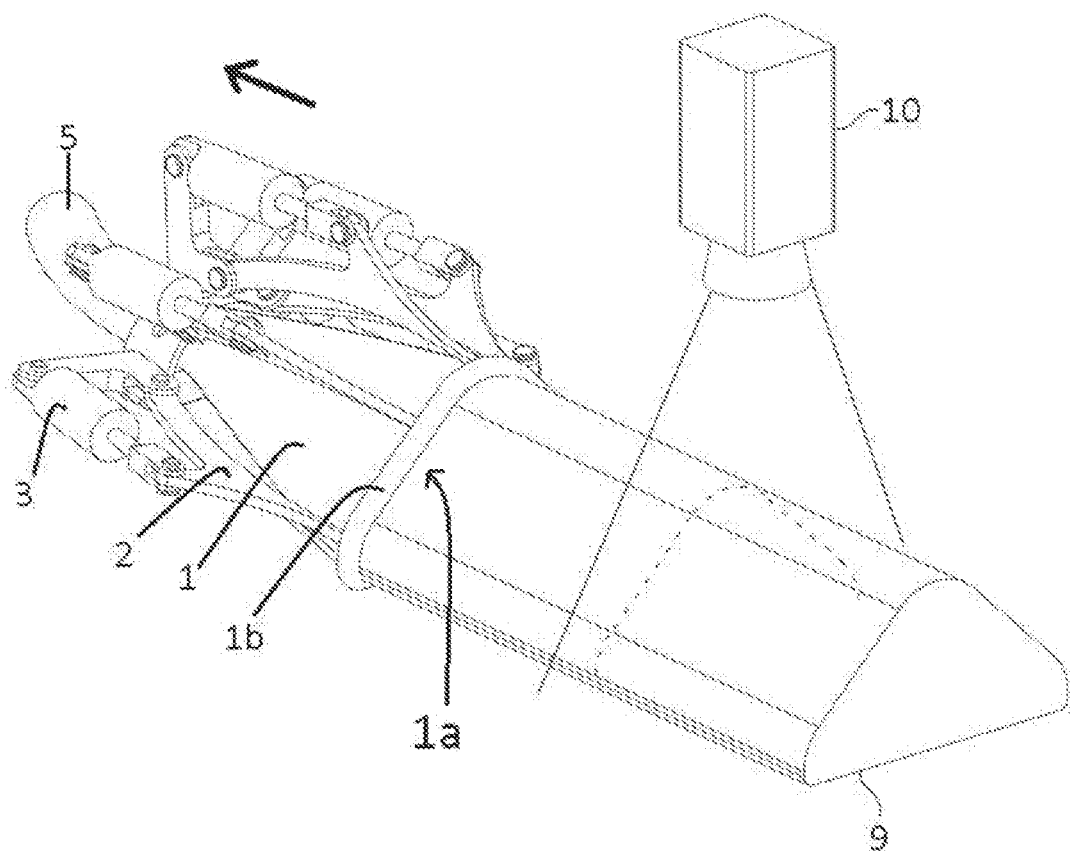
FIG. 11 illustrates use of the device for applying a bead of material.

Aspects of the method for using the device are to be clarified even further with the aid of FIG. 11. The method aspects are not limited to the embodiment of the device and the nozzle body shown here, but can be carried out analogously in connection with the other devices and nozzle bodies discussed in this application.

A material for the bead of material 9 is fed into the inner cavity through the feed hose 5, which is connected to the feed opening, and then exits the outlet opening 1a on the opposite side and forms the bead of material 9. In this case, while the material exits from the outlet opening 9, the device is moved in the direction of the arrow shown in the figure along the application surface. The cross section of the outlet opening 1a is changed by the actuator system for changing a contour of the bead of material 9 in order to change the geometry of the bead of material 9. A triangular shape for the bead of material 9 is shown in FIG. 11. For example, it is possible to keep the shape constant for the bead of material 9, at least in sections, and to change the geometry, for example, after a predetermined length or when a predetermined location on the application surface has been reached. Moving along the application surface and changing the geometry of the outlet opening can be done manually or automatically, for example, with the aid of a six-axis robot. The device can be moved at a distance from the application surface or so that the device, particularly the nozzle body, touches the application surface with the underside.

FIG. 11 shows that the device has a measuring system which comprises a sensor 10 which detects the surface of the bead of material 9 that has already been applied. The recorded measurement data can be used in various ways. For example, it is possible to save the determined contour for quality monitoring and documentation. Alternatively or additionally, the device can be actively controlled via the measurement data. This means that when the applied bead of material leaves the desired contour, fingers 2 can be adjusted and the geometry reduced or enlarged. In one embodiment of the method, it is also possible to position the application unit in space with the aid of sensor values in order to ensure an exact positioning of the applied bead of material on the workpiece.

For example, between 3 kg and 20 kg of material are applied per minute in the method. A width of the bead of material 9 can be between 50 mm and 200 mm, for example.

It can be provided that one or more beads of material 9 are produced using the same nozzle body 1 and that the one or the more beads of material 9 have a combined weight of between 800 kg and 3000 kg. It can be provided that the nozzle body 1 is disposed of after the creation of this one or more beads 9 of material, so that the nozzle body 1 does not need to be cleaned.

The application surface can be, for example, a surface of a wind turbine component, for example, preferably a wind turbine rotor blade.

Figure 12:
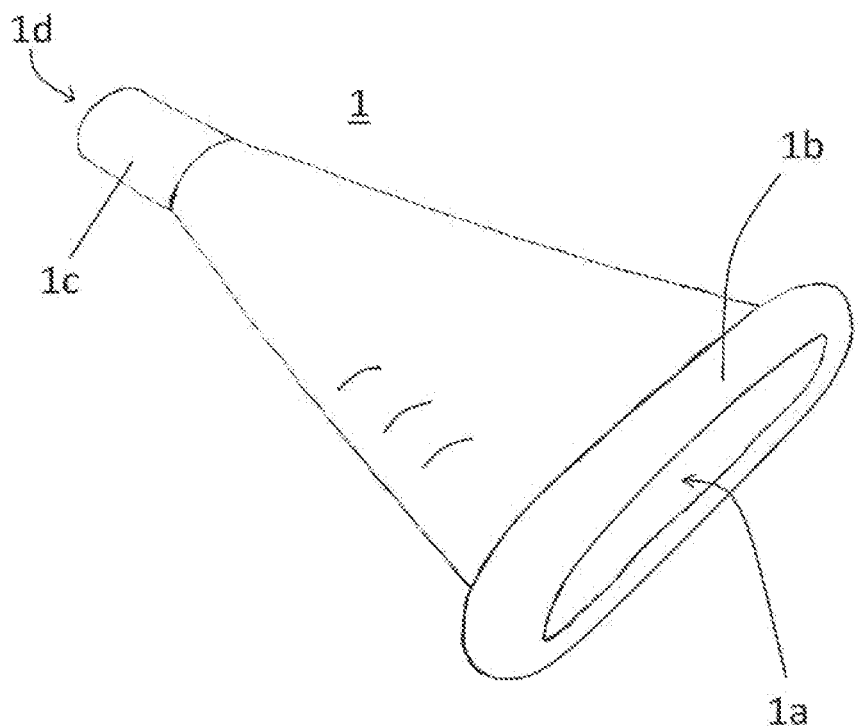
FIGS. 12 and 13 illustrate the nozzle body for the device for applying a bead of material in a possible embodiment.
Figure 13:
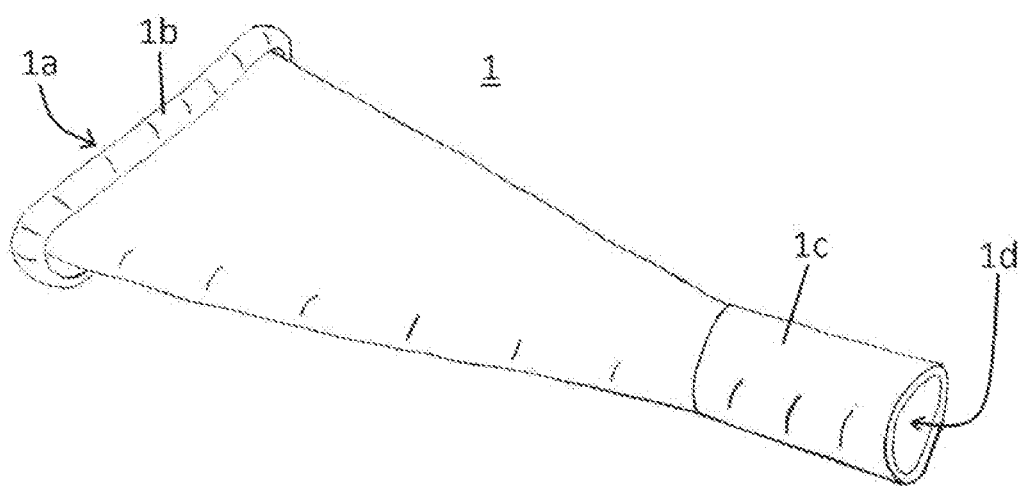

FIGS. 12 and 13 show an embodiment of the nozzle body 1 which can be used in the devices shown.

The nozzle body 1 is a one-piece, additively manufactured body which has the inner cavity and tapers from the outlet opening 1a towards the feed opening 1d. The outlet opening 1a can be seen in FIG. 12 and the feed opening 1d in FIG. 13.

The nozzle body 1, including the bent region, is manufactured additively. If a recessed lower border section or an incision is provided (see FIG. 5), the nozzle body 1 is produced, for example, in an additive manner at the same time as the recessed border section or incision.

At the end of the feed opening 1d, the nozzle body forms a tubular connecting piece, which constitutes a connection option for the feed hose.

A wall thickness of the nozzle body 1 can be spatially constant or vary. For example, the wall thickness in the region of the connecting piece can be increased.

The nozzle body 1 is made of a highly flexible rubber-like plastic, for example, from the Tango family or from the Agilus30 family from Stratasys Ltd., and has a Shore hardness of between 10 and 95 or between 27 and 95. The Shore hardness of the nozzle body 1 can vary locally in order, for example, to achieve good deformability at the outlet opening 1a and to prevent deformation of the connecting piece 1c, for example, to prevent the feed hose 5 from sliding off.

The nozzle body 1 is intended for single use.

FIGS. 14 to 17 relate to a further embodiment of the device for applying a bead of material.

FIGS. 14 and 15 show the device, wherein a support structure is connected to the nozzle body, in an oblique view and in a view from above, and FIGS. 16 and 17 again show the nozzle body without the support structure for better clarity. With regard to the properties of the nozzle body, reference is therefore made to all four figures at the same time. FIG. 16 shows an oblique view of the nozzle body and FIG. 17 shows a view from below in which an interior of the nozzle body is visible.

The device shown in FIGS. 14 to 17 for applying a bead of material 9 thus comprises the flexible nozzle body 1, which defines a flow-through volume through which a material can flow for the bead of material 9 and which is at least partially delimited by a walling formed by the nozzle body 1. A feed opening for feeding the material opens into the flow-through volume (see FIG. 17). A connecting piece 1c is provided for connecting the feed opening 1d to the feed hose 5 for the material. The nozzle body 1 defines a mouth region 1a through which the material can exit from the volume. An oblique view of the mouth region is shown in FIGS. 14 and 16. The flow-through volume 1i is designed as a half-open volume that is open at the bottom and in the mouth region 1a and is delimited at the top and on two opposite sides by the walling formed by the nozzle body 1.

When using the device according to FIGS. 14 to 17, this is placed on an application surface 11. The intended arrangement of the nozzle body relative to the application surface is shown in FIGS. 14 and 16 by way of example.

The application surface 11 closes off the half-open volume at the bottom and also delimits the outlet opening 1a, which is otherwise surrounded by a border 1b of the mouth region. The arrow drawn under the device represents the direction of movement during application. Via the feed opening, material is fed into the volume delimited by the nozzle body and application surface, which material then exits through the outlet opening 1a and forms the stable bead of material, the contour of which is defined by the outlet opening 1a.

An actuator system 3, 3', which is arranged on the nozzle body, is set up to change a cross section of the mouth region while deforming the nozzle body. The walling forms a barrier between the flow-through volume and the actuator system.

FIGS. 14 and 15 show a support structure 12 with actuating units 3 designed as linear actuators for adjusting the flexible nozzle body. Different profile cross sections of the bead of material are set, on the one hand, by the three vertically arranged linear actuators 3 while deforming the border 1b. The bead of material can therefore be given a variable profile when it leaves the cavity formed between the nozzle body and the application surface through the outlet opening 1a which has thus been changed in its shape. The linear actuators 3 are connected in a form-fitting manner to holding structures 1h of the nozzle body via movable fingers 2. These holding structures 1h are located on the outside of the nozzle body at the border 1b of the mouth region or the outlet opening.

Furthermore, the nozzle body comprises lateral holding structures 1j. These are also connected to the support structure 12 and enable the nozzle body to be pressed against the application surface 11. These lateral holding structures 1j are provided at the lower end of the sides of the walling and are designed there as outwardly bent sections with round beads, which enable a form fit with complementary structures of the support structure 12. They extend over an entire length of the nozzle body 1. The lateral holding structures 1j connected to the support structure enable the width of the nozzle body 1 to be fixed when it is under the pressure of the material flowing through it and/or is deformed by the actuator system 3 arranged above, and a pressing of the nozzle body against the application surface 11, whereby material exiting unintentionally on the side can be prevented. The lateral holding structures are also connected to the supporting structure via an actuator system. This actuator system associated with the lateral holding structures 1j enables, particularly, a widening of the nozzle body and thus also of the cross section of the mouth region and thus of the outlet opening. For this purpose, further actuating units 3' designed as linear actuators are provided in the support structure 12, which are visible in the plan view in FIG. 15. These transmit a force via the fingers 2' formed as square profiles to a channel rail and finally to the round bead of the flexible nozzle body and thus also serve to adjust the profile cross section of the bead of material 9.

The view from below shown in FIG. 17 enables a view into the interior of the nozzle body which is open at the bottom. This shows an oblique view of an end face facing away from the mouth region 1a, which end face is at the front when the device is used. There is a frontal opening 1f, that is, the volume defined by the nozzle body 1 is open on three sides: firstly, at the bottom, where the volume is delimited by the application surface when used, secondly on the mouth side, where the mouth region and thus the outlet opening 1a are provided, and thirdly on the front, in order to promote the pressure conditions in the volume of the nozzle body during use.

FIG. 17 shows that the feed opening 1d opens out approximately centrally into the volume of the nozzle body at the top. The flow-through volume 1i, through which the material for the bead 9 can flow, extends on the mouth side thereof. A buffer volume 1g extends on the frontal side thereof. An optimal filling of the flow-through region of the nozzle body can be guaranteed in this way. Differences between material feed and material exit, which can occur at non-constant feed speeds, particularly with manual guidance, can be compensated by allowing material to flow into the buffer volume or from the buffer volume back into the flow-through volume. The buffer volume has a larger cross section than the flow-through volume for this purpose.

The nozzle body is made of highly elastic silicone and allows a simultaneous enlargement of the cross section of the mouth region by more than 100% in width and height.

The application relates to the following aspects, among others:

1. A device for applying a bead of material (9), comprising
    a flexible nozzle body (1) which has an inner cavity through which a material for the bead of material (9) can flow and which is delimited by a walling formed by the nozzle body, having a feed opening (1d) for feeding the material into the inner cavity and a outlet opening (1a) for the material facing away from this feed opening (1d),
    an actuator system which is arranged on the nozzle body (1) and which is set up to change a cross section of the outlet opening (1a) of the nozzle body (1) while deforming the nozzle body (1), the walling forming a barrier between the inner cavity and the actuator system.

2. The device according to aspect 1, wherein the actuator system comprises at least one finger (2) which can be moved by an actuating unit (3) and which is fastened to a border (1b) of the outlet opening (1a) or in the vicinity of the border (1b) of the outlet opening (1a) on the nozzle body (1).

3. The device according to any one of the preceding aspects, wherein the actuator system is arranged on an outside of the nozzle body (1).

4. The device according to aspect 3, wherein the actuator system for the nozzle body (1) forms a shaping external structure having a variable shape, against which the nozzle body (1) can be pressed under conveying pressure.

5. The device according to any one of the preceding aspects, wherein the nozzle body (1) has an outwardly bent section in the region of the border (1b) of the outlet opening (1a).

6. The device according to any one of the preceding aspects, wherein the actuator system is connected to the nozzle body (1) in a form-fitting manner, wherein the outwardly bent region of the nozzle body (1) is preferably put over the actuator system for fastening to the actuator system and/or is hooked behind on the actuator system.

7. The device according to any one of the preceding aspects, wherein the actuator system engages in an upper border section of the border (1b) of the outlet opening (1a) or in the vicinity of the upper border section, so that the cross section of the outlet opening (1a) can be adjusted by deforming the upper border section by means of the actuator system.

8. The device according to aspects, wherein a lower border section facing away from the upper border section is recessed and/or incised.

9. The device according to aspect 7 or 8, wherein for the lower border section facing away from the upper border section, a fixed shape is predetermined by a frame structure (6).

10. The device according to aspect 7 or 8, wherein the lower border section facing away from the upper border section is held in a freely deformable manner.

11. The device according to aspect 7 or 8, wherein the actuator system also engages in the lower border section facing away from the upper border section in the vicinity of the lower border section, so that the cross section of the outlet opening (1a) can be adjusted by deforming the upper and/or lower border section by means of the actuator system.

12. The device according to aspect 11, wherein the actuator system is arranged symmetrically around the output opening, preferably with rotationally symmetrically arranged fingers (2) which are fastened to the border (1b) or in the vicinity of the border (1b) of the outlet opening (1a).

13. The device according to any one of the preceding aspects, comprising a tilt actuator system which is set up to tilt the outlet opening (1a) of the nozzle body (1) with respect to a plane defined by its cross section in the relaxed state while deforming the nozzle body (1).

14. The device according to aspect 13, wherein the tilt actuator system is formed by the actuator system for changing the cross section of the outlet opening (1a) of the nozzle body (1).

15. The device according to aspect 13, wherein the tilt actuator system is provided as a further actuator system (7) in addition to the actuator system for changing the cross section of the outlet opening (1a) of the nozzle body (1).

16. The device according to any one of the preceding aspects, wherein the actuator system for changing the cross section of the outlet opening (1a) of the nozzle body (1) comprises at least 2, preferably at least 3, particularly preferably at least 5 and/or at most 20 fingers, preferably at most 15 fingers.

17. The device according to any one of the preceding aspects, wherein the nozzle body is designed as a disposable product for single use.

18. The device according to any one of the preceding aspects, wherein the nozzle body (1) is designed in one piece and/or is manufactured additively.

19. The device according to any one of the preceding aspects, wherein the nozzle body (1) is made of a highly flexible plastic and/or has a spatially varying Shore hardness.

20. The device according to any one of the preceding aspects, further comprising a sensor (10) for detecting a contour of the bead of material (9), wherein the device preferably has a control device which controls the actuator system based on values detected by the sensor (10).

21. A method for using the device according to any one of the preceding aspects, comprising the following steps:
feeding a material for the bead of material (9) through the feed
opening so that the material exits from the outlet opening (1a) and,
while the material exits from the outlet opening (1a), moving the device along an application surface, so
that the bead of material (9) is formed
on the application surface by the exiting material,
changing the cross section of the outlet opening (1a) by the actuator system for changing a contour of the bead of material (9).

22. The method according to aspect 21, wherein at least 100 g, preferably at least 1 kg, particularly preferably at least 3 kg and/or at most 25 kg, preferably at most 20 kg of material are applied per minute.

23. The method according to aspect 21 or 22, wherein the bead of material has a width of at least 20 mm, preferably at least 30 mm, particularly preferably at least 50 mm and/or at most 400 mm, preferably at most 300 mm, particularly preferably at most 200 mm.

24. The method according to any one of aspects 21 to 23, wherein one or more beads of material (9) are produced using the same nozzle body (1) and the one or the more beads of material (9) have a combined weight of at least 100 kg, preferably at least 500 kg, particularly preferably at least 800 kg and/or at most 3000 kg.

25. The method according to any one of aspects 21 to 24, wherein the application surface is a surface of a wind turbine component, preferably a wind turbine rotor blade.

LIST OF REFERENCE NUMERALS 1 nozzle body
1a outlet opening / mouth region
1b border of the outlet opening / the mouth region
1c connecting piece
1d feed opening for feeding a material
1e section of the border 1b delimiting the incision
1f frontal opening
1g buffer volume
1h holding structure
1i flow-through volume
1j lateral support structure
2, 2' fingers
3, 3' actuating units
4 holder
5 feed hose 6 frame structure
6a base surface
7 further actuator system as tilt actuator system for angle adjustment
9 bead of material
10 sensor
11 application surface
12 support structure

The invention claimed is:

1. A device for applying a bead of material, comprising
a flexible nozzle body which defines a flow-through volume through which a material for the bead of material can flow and which is partially delimited by a walling formed by the nozzle body, having a feed opening for feeding the material into the flow-through volume, the nozzle body defining a mouth region through which the material can exit the volume,
an actuator system which is arranged on the nozzle body and which is set up to change a cross section of the mouth region while deforming the nozzle body,
the walling forming a barrier between the flow-through volume and the actuator system,
wherein the flow-through volume is designed as a half-open volume which is open at a bottom and in the mouth region and which is delimited at a top and on two opposite sides by the walling formed by the nozzle body.

2. The device according to claim 1, wherein the actuator system comprises at least one finger which can be moved by an actuating unit and which is fastened to the nozzle body one of (1) at a border of the mouth region and (2) in the vicinity of the border of the mouth region.

3. The device according to claim 1, wherein the actuator system is arranged on an outside of the nozzle body.

4. The device according to claim 1, wherein the actuator system for the nozzle body forms a shaping external structure having a variable shape, against which the nozzle body can be pressed under conveying pressure.

5. The device according to claim 1, wherein at least one of (1) the nozzle body has an outwardly bent section in the region of the border of the mouth region, and (2) the nozzle body has holding structures in the region of the border of the mouth region.

6. The device according to claim 1, wherein the actuator system is connected to the nozzle body in a form-fitting manner.

7. The device according to claim 5, wherein at least one of (1) at least one of the outwardly bent region of the nozzle body is put over the actuator system for fastening to the actuator and is hooked behind on the actuator system; and (2) wherein the holding structures are connected to complementary structures of the actuator system.

8. The device according to claim 1, comprising a tilt actuator system which is set up to tilt the mouth region with respect to a plane defined by the cross section of the mouth region in a relaxed state while deforming the nozzle body.

9. The device according to claim 8, wherein the tilt actuator system is formed by the actuator system for changing the cross section of the mouth region of the nozzle body.

10. The device according to claim 8, wherein the tilt actuator system is provided as a further actuator system in addition to the actuator system for changing the cross section of the mouth region of the nozzle body.

11. The device according to claim 1, wherein the nozzle body is open on an end face opposite the mouth region.

12. The device according to claim 1, wherein the nozzle body forms a buffer volume.

13. The device according to claim 1, wherein the actuator system for changing the cross section of the mouth region of the nozzle body comprises at least two fingers.

14. The device according to claim 1, wherein the nozzle body is designed as a disposable product for single use.

15. The device according to claim 1, wherein the nozzle body is at least one of designed in one piece and is manufactured additively.

16. The device according to claim 1, wherein the nozzle body is at least one of made of a highly flexible plastic and from a highly elastic silicone and has a spatially varying Shore hardness.

17. The device according to claim 1, wherein the nozzle body allows an increase in at least one of the width and the height of the cross section of the mouth region by at least 50% compared to a relaxed state of the mouth region.

18. The device according to claim 1, further comprising a sensor for detecting a contour of the bead of material.

19. A method for using a device for applying a bead of material, the device comprising:
a flexible nozzle body which defines a flow-through volume through which a material for the bead of material can flow and which is partially delimited by a walling formed by the nozzle body, having a feed opening for feeding the material into the flow-through volume, the nozzle body defining a mouth region through which the material can exit the volume,
an actuator system which is arranged on the nozzle body and which is set up to change a cross section of the mouth region while deforming the nozzle body,
the walling forming a barrier between the flow-through volume and the actuator system,
wherein the flow-through volume is designed as a half-open volume which is open at a bottom and in the mouth region and which is delimited at a top and on two opposite sides by the walling formed by the nozzle body,
wherein a viscous material is used to produce a stable bead of material, the contour of which is defined by the cross section of the mouth region.

20. The method according to claim 19, further comprising the following steps:
feeding a material for the bead of material through the feed opening so that the material exits from the mouth region and, while the material exits from the mouth region,
moving the device along an application surface, so that the bead of material is formed on the application surface by the exiting material, and
changing the cross section of the mouth region by the actuator system for changing a contour of the bead of material.

21. The method according to claim 19, wherein the device is placed on an application surface so that the application surface delimits the flow-through volume downwards in order to form a cavity with an outlet opening, which is defined by the mouth region and the application surface,
further comprising the steps:
feeding a material for the bead of material through the feed opening in the cavity so that the material exits from the outlet opening and, while the material exits from the outlet opening,
moving the device along the application surface, so that the bead of material is formed on the application surface by the exiting material, and
changing the cross section of the mouth region by the actuator system for changing a contour of the bead of material.

22. The method according to claim 19, wherein at least 100 g of material are applied per minute.

23. The method according to claim 19, wherein the bead of material has a width of at least 20 mm.

24. The method according to claim 19, wherein at least one bead of material is produced using the same nozzle body and the at least one bead of material has a total weight of at least 100 kg.

25. The method according to claim 20, wherein the application surface is a surface of a wind turbine component.

* * * * *